US008597705B2

(12) United States Patent
Hellaby et al.

(10) Patent No.: US 8,597,705 B2
(45) Date of Patent: Dec. 3, 2013

(54) METHOD FOR MAKING DECONTAMINATED BAKERY PRODUCTS, DECONTAMINATED BAKERY PRODUCTS, AND DEVICE FOR IMPLEMENTING SAID METHOD

(75) Inventors: Elodie Hellaby, Saint-Laure (FR); Jean-Luc Thiaudiere, Mozac (FR)

(73) Assignee: Jacquet Panification, Saint Beauzire (FR)

( * ) Notice: Subject to any disclaimer, the term of this patent is extended or adjusted under 35 U.S.C. 154(b) by 246 days.

(21) Appl. No.: 12/918,422

(22) PCT Filed: Feb. 19, 2009

(86) PCT No.: PCT/EP2009/051993
§ 371 (c)(1),
(2), (4) Date: Sep. 24, 2010

(87) PCT Pub. No.: WO2009/103770
PCT Pub. Date: Aug. 27, 2009

(65) Prior Publication Data
US 2011/0014321 A1    Jan. 20, 2011

(30) Foreign Application Priority Data
Feb. 19, 2008   (FR) .................................... 08 51074

(51) Int. Cl.
*A21D 15/06* (2006.01)
(52) U.S. Cl.
USPC ............. 426/241; 426/74; 426/248; 426/549; 426/497; 426/523
(58) Field of Classification Search
USPC ........... 426/74, 248, 549–560, 496–498, 505, 426/241–242, 524, 523
See application file for complete search history.

(56) References Cited

U.S. PATENT DOCUMENTS 3,170,795 A * 2/1965 Andre ........................... 426/551
4,271,203 A * 6/1981 Schiffmann et al. .......... 426/243
(Continued)

FOREIGN PATENT DOCUMENTS

| GB | 2 339 134 | 1/2000 |
|---|---|---|
| JP | 2001252061 | 9/2001 |
| WO | WO 88/03369 | 5/1988 |

OTHER PUBLICATIONS

Mimouni et al., "Surface of Foods and Packaging Treated by Pulsed Light," *Technique de L'Ingenieur Agroalimentaire* (2002).
(Continued)

*Primary Examiner* — Drew E Becker
(74) *Attorney, Agent, or Firm* — James C. Lydon

(57) ABSTRACT

Method for making decontaminated bakery products, including the following, preferably consecutive, steps: (1) preparing a dough by mixing: A. flour; B. water; C. optionally fat(s); D. at least one fermentation agent; E. NaCl; F. optionally sugar(s); G. at least one filler agent; H. at least one bread-making enhancer including an acid and/or acid salt of gluconodelta-lactone (GDL); I. optionally one low sodium content mixture of minerals; J. optionally one or more additives; (2) shaping the dough; (3) fermenting the dough; (4) at least partially baking the dough; (5) optionally cooling the bread; (6) decontaminating the bread by pumped-light processing; (7) optionally slicing the bread; packaging, preferably into bags. Also disclosed is a bakery product free of any additional chemical preservatives of the E200 type or without vaporization of an ethanol-containing liquid, that has an extended shelf-life, and a device for implementing the method.

23 Claims, 3 Drawing Sheets

(56) References Cited

U.S. PATENT DOCUMENTS

| | | | |
|---|---|---|---|
| 4,454,162 A * | 6/1984 | Schanze | 426/74 |
| 4,652,454 A * | 3/1987 | Remesy et al. | 426/74 |
| 5,034,235 A * | 7/1991 | Dunn et al. | 426/238 |
| 5,514,387 A * | 5/1996 | Zimmerman et al. | 426/74 |
| 5,900,211 A * | 5/1999 | Dunn et al. | 422/24 |
| 6,465,027 B1 | 10/2002 | Taillade et al. | 426/61 |
| 6,582,722 B1 * | 6/2003 | Clark et al. | 424/439 |
| 6,660,311 B2 * | 12/2003 | Goedeken et al. | 426/27 |
| 6,730,923 B1 * | 5/2004 | May et al. | 250/494.1 |
| 7,452,561 B2 * | 11/2008 | Newman | 426/248 |
| 2004/0091588 A1 * | 5/2004 | Li | 426/248 |
| 2007/0020369 A1 * | 1/2007 | Roy et al. | 426/549 |
| 2007/0110867 A1 * | 5/2007 | Kouno et al. | 426/524 |
| 2010/0183779 A1 * | 7/2010 | Felix | 426/231 |
| 2010/0247709 A1 * | 9/2010 | Ryberg | 426/3 |

OTHER PUBLICATIONS

Elmnasser et al., "Pulsed-light Systen as a Novel Food Decontamination Technology: A Review," 53 *Can. J. Microbiol.* 813 (2007).

* cited by examiner

METHOD FOR MAKING DECONTAMINATED BAKERY PRODUCTS, DECONTAMINATED BAKERY PRODUCTS, AND DEVICE FOR IMPLEMENTING SAID METHOD

TECHNICAL FIELD

The field of the invention relates to the industrial production of fresh or semi-fresh, baked or semi-baked, bakery products, and in particular of conventional breads, of sandwich breads or the like, such as brioche, Viennese pastries or cakes. All these bakery products are hereinafter referred to without distinction as "bread(s)" in the interests of simplification.

The factory-produced bakery products targeted are those which benefit from long shelf lives and good organoleptic and nutritional qualities.

GENERALITIES—PRIOR ART—TECHNICAL PROBLEM(S)

Conventionally, the industrial production of a bread comprises the following steps:
  preparing the dough, which comprises mixing the conventional ingredients, namely, in particular, flour, water, sugar, yeast, fats and breadmaking additives; and also kneading, forming and rounding,
  shaping this dough, preferably using a mold ("molding"),
  fermentation carried out, for example, at 35° C. and enabling, for example in 1h30, an increase in the volume of the dough according to a multiplying factor, for example of three,
  baking in conventional bakery ovens (150 to 240° C.),
  demolding,
  optional cooling,
  optional slicing,
  packaging, preferably into bags in the absence of air.

In this type of industrial production, it is continually sought to improve the microbiological quality of the breads, for obvious reasons of hygiene, public health and optimization of the shelf life of fresh or semi-fresh factory-produced breads. This concern goes together with that of maintaining the organoleptic and nutritional qualities of these breads.

This quest for quality means first of all controlling the risks of contamination of the products as soon as they come out of the oven, and in particular through taking steps to treat the air by filtration, to place the cooling chamber at an increased pressure and to use material designed to comply most satisfactorily with the hygiene regulations.

The combating of microbiological contaminations which affect the storage of breads also involves the use of bread decontamination and/or preservation treatments.

Bread storage can be characterized, inter alia, by the Best Before Date-BBD (defined below on page 6).

These known treatments used in the baking industry are presented below.

Chemical Methods for Preserving Bakery Products:

The use of chemical preservatives such as sorbic acid or calcium propionate, combined with a reduction in the water activity of the products and with pH values which are as low as possible (addition of lactic acid or acetic acid), makes it possible to increase the storage of bakery products. However, the use of preservatives for limiting microbial growth in breads goes against the demand by consumers for a reduction in preservatives in food products.

Spraying ethanol or aroma(s) in ethanolic solution onto breads in order to inhibit or reduce the growth rate of microorganisms is an effective and economical known means of increasing the shelf life of bakery products. However, new regulatory constraints are increasingly appearing and, in addition, alcohol in food products poses nutritional problems (presence of alcohol in the final product) and also safety problems at work (risk of fire and difficult handling).

Physical Methods for Preserving Bakery Products:

Packaging under a modified atmosphere ($CO_2$ and $N_2$) can be used to increase the shelf life of bakery products. However, this preservation technique is restrictive in terms of the packaging since it does not enable sealed packaging to be used. In addition, this technique is costly since the barrier films and the gas mixtures used are expensive.

Infrared (IR) treatment makes it possible to decontaminate the surface of bakery products. However, this method has two major limits. The first is that the IR radiation induces modifications in the structure of the bread, since it causes further baking of the bread. The second limit is financial in nature, since the packagings suitable for this technology are expensive.

These known methods, whether they are used separately or combined with one another, are not sufficient to significantly reduce, for example, the detrimental alterations to products due to microorganisms, and in particular to molds. However, these detrimental alterations cause significant financial losses and greatly harm the brand image of the manufacturer among consumers.

A method for cold decontamination and sterilization of food products at the surface by means of pulsed light is, moreover, known, as described in the article "*Mimouni A. 2000. Aliments et emballages traités en surface par lumière pulsée. Techniques de l'Ingénieur. [Food products and packagings surface-treated with pulsed light. Techniques for the engineer]. Food-processing treaty F 3040. 6 p*". In particular, this article discloses the effect of pulsed light on the preservation of parbaked bread packaged in a plastic bag. The pulsed-light system uses the pulsed-power technology to destroy the microorganisms by subjecting them to intense flashes of light. For this, electrical energy is accumulated in a capacitor, and is then transferred from the capacitor to a quartz jacketed lamp containing an inert gas, xenon. The lamp emits an intense flash of light which is focused on the treatment surface by the reflector of the lamp. This lamp emits light having a wavelength of between 200 nm in the ultraviolet range and 1 mm in the near infrared range. The spectrum of wavelengths of the light emitted by the sun at the surface of the earth is to a great extent similar to that of the light emitted by the pulsed-light process (up to 90 000 times more intense than the sun). The sterilizing effect of the pulsed light is due to the UV spectrum, at pulses of short duration ($10^{-6}$ to 0.1 s) and at a very high energy peak. According to this article, the pulsed-light treatment is effective on a certain number of food products: parbaked bread, seafood products, meat products, fruits, vegetables and other products, which show a significant microbial reduction while at the same time maintaining their oganoleptic and nutritional qualities. However, such a treatment can be perfected in terms of decontamination performance, in particular with regard to the level of received energy (fluence) required to destroy the microorganisms (energy/% microorganisms destroyed ratio). This required level of energy is of course determining from the economic point of view. It would also be nice to have as broad a spectrum of action of the pulsed light as possible, as regards in particular mold. It has also been possible to observe that the pulsed-light technology loses its effectiveness on products such as baked or semi-baked breads, which have surfaces to be treated which are uneven or which exhibit bumps. These surfaces are in fact barely reached by the energy of the flashes, or not at all.

In addition, patent application FR-A-2894432 describes a breadmaking improver comprising an acid and/or an acid salt (acid preferment: 2% dry leaven) in combination with glucono-delta-lactone (GDL 0.5%). This combination of a dry leaven and of GDL is presented as having a beneficial effect on the rheological properties of the dough, but also of the bread product obtained by baking said dough.

OBJECTIVES OF THE INVENTION

In this context, one of the essential objectives of the present invention is to provide an effective alternative method for improving the microbiological quality of factory-produced breads, by destroying the surface contamination, in particular fungal contamination of these products, without affecting their organoleptic and nutritional qualities.

Another essential objective of the invention is to provide a method for producing decontaminated bakery products, in particular sandwich breads or the like, free of additional chemical preservative(s) such as those of the E200 range.

Another essential objective of the invention is to provide a method for producing decontaminated bakery products, in particular sandwich breads or the like, the BBD of which is prolonged, preferably greater than or equal to 20 days, or even greater than or equal to 30 days.

Another essential objective of the invention is to provide a method for producing decontaminated bakery products, in particular sandwich breads or the like, this method having to be reliable, simple and economical.

Another essential objective of the invention is to provide a method for producing decontaminated bakery products, in particular sandwich breads or the like, by implementing the pulsed-like technology, in which the light radiation reaches, in an equivalent manner, the entire surface of the at least partially baked bread, even if said bread has surfaces to be treated which are uneven or which exhibit bumps.

Another essential objective of the invention is to provide novel decontaminated factory-produced bakery products, in particular sandwich breads or the like, the BBD of which is prolonged, preferably greater than or equal to 20 days, or even greater than or equal to 30 days, and which have good organoleptic and nutritional qualities, this prolonged BBD being advantageously obtained without the use of chemical preservatives of the E200 range and/or of ethanol.

BRIEF DESCRIPTION OF THE INVENTION

These objectives, among others, are achieved by means of the present invention which relates first of all to an industrial method for producing decontaminated bakery products, in particular sandwich breads or the like, characterized in that it comprises the following essential, preferably consecutive, steps:
(1) Preparing a dough by mixing in particular the following ingredients:
  A. flour;
  B. water;
  C. optionally, added fat(s);
  D. at least one fermentation agent;
  E. NaCl (salt);
  F. optionally, sugar(s);
  G. at least one filler chosen from hydrogenated monosaccharides and/or oligosaccharides, preferably from the group comprising: hydrogenated isomaltulose, lactitol, maltitol, erythritol, xylitol, mannitol, sorbitol, and mixtures thereof, maltitol being preferred;
  H. at least one breadmaking improver comprising an acid and/or acid salt and glucono-delta-lactone (GDL);
  I. optionally, at least one low-sodium mixture of minerals, preferably derived from milk;
  J. optionally, one or more additives;
(2) Shaping said dough, preferably using a mold;
(3) Fermenting said dough thus prepared;
(4) At least partially baking said dough thus shaped;
(5) Optionally cooling the bread;
(6) Decontaminating the bread by pulsed-light treatment;
(7) Optionally slicing the bread;
(8) Packaging, preferably into bags.

According to another of its aspects, the invention also relates to a novel, decontaminated, factory-produced bakery product, in particular a sandwich bread or the like, preferably obtained by means of the method of production as defined above, characterized:
in that it has at least one of the following characteristics:
  a. it is free of artificial preservative(s) of the E200 range as approved by the European Union,
  b. it has not been decontaminated by spraying with a liquid comprising ethanol,
and in that its BBD is greater than or equal to 20 days, preferably greater than or equal to 30 days.

According to another of its aspects, the invention also relates to an industrial device for producing decontaminated bakery products, in particular sandwich breads or the like, suitable for implementing the method according to the invention described above, characterized in that it comprises at least one pulsed-like system for bread decontamination, comprising one or more lamps capable of producing, preferably simultaneously, at least one flash.

DETAILED DESCRIPTION OF THE INVENTION

Figure 1:
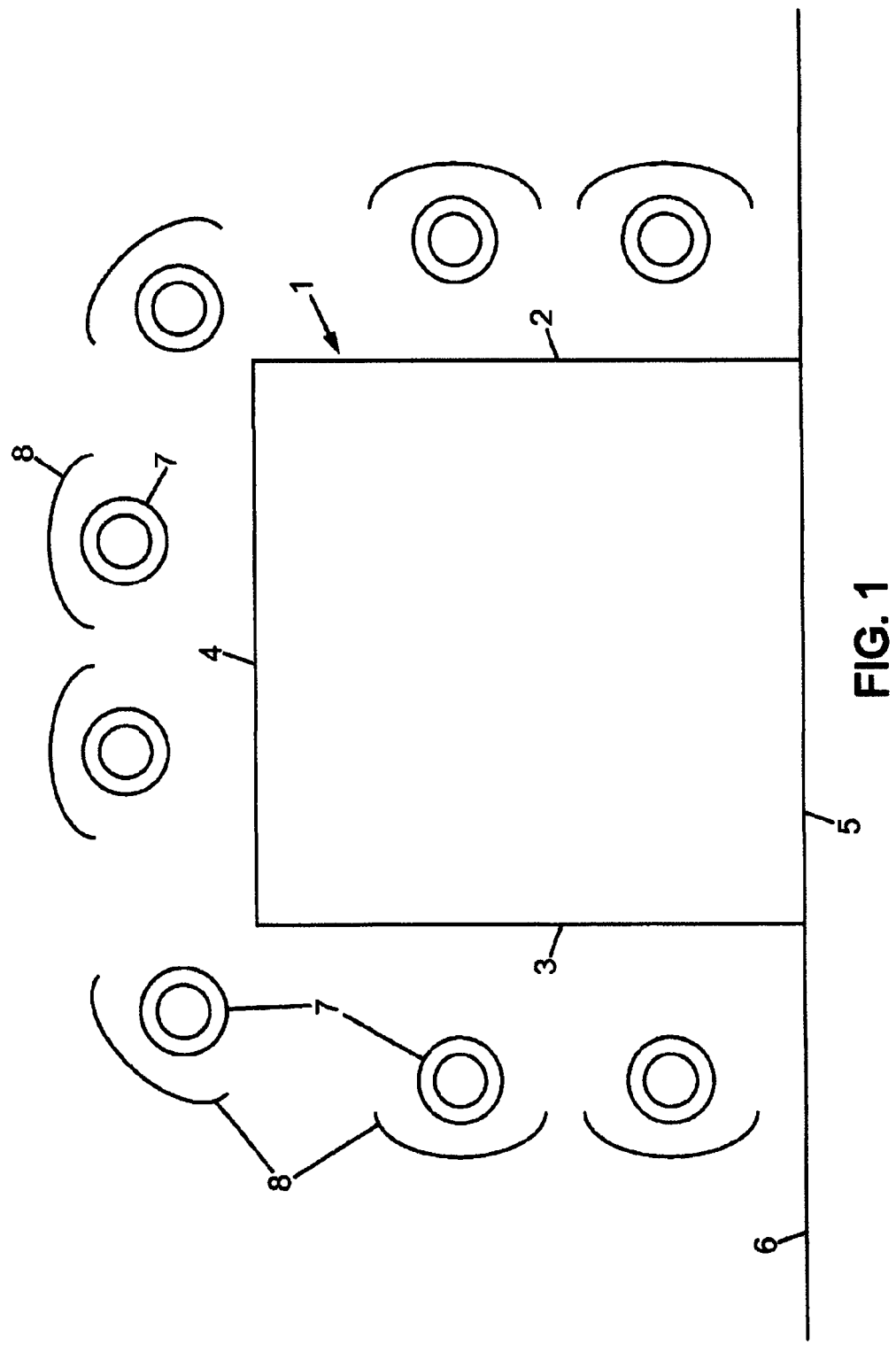
FIG. 1 represents schematically a front view of the distribution of the lamps in the chamber of the pulsed-light system.

It is to the inventors' credit to have combined physical surface decontamination by pulsed light [step (6)] with the ingredients G-H, inter alia, in this industrial breadmaking method.

It should be noted that bread microflora can be of three types:
a. The beneficial microflora derived mainly from the leaven and which allows the breadmaking phenomenon to take place;
b. The altering microflora which exert harmful effects on the bread and reduce its shelf life;

c. The pathogenic microflora which may be responsible for food infections or food poisoning.

The microflora b and c are naturally the specific targets of the decontamination specific to the invention.

Definitions

For the purpose of the present disclosure, the terms "breadmaking", "bakery" and "baker" should be interpreted broadly as referring to the bakery and Viennese pastry fields, and in general to the field of the production of products which are oven-baked from fermented doughs based on cereal flour.

For the purpose of the present disclosure, the BBD refers back, for example, to the definition given by the General Directorate for Fair Trading, Consumer Affairs and Fraud Control (DGCCRF). According to this definition, the BBD does not have the imperative nature of the Use-By Date (UBD). It is just a piece of information for the consumer which may be accompanied by an indication of the storage conditions, in particular temperature conditions, which, if respected, make it possible to ensure that the product lasts as indicated. The BBD is stated by the indication "best before...", followed by an indication which depends on how long the product lasts: "day and month", "month and year" or "year". Once the BBD date has been passed, the food product may have lost all or some of its specific qualities, without however constituting a danger to whoever ingests it. This is the case, for example:

of coffee, which, after a certain period of time, loses its flavor;

of infant dietetic foods, which lose their vitamin content over time.

For the purpose of the invention, the BBD corresponds to the period of time beyond which the organoleptic and nutritional properties of the breadmaking product are impaired, in particular, for example, the surface-appearance of yeast or mold colonies, the texture of the crumb, the elasticity and flexibility properties of which are degraded, the appearance of an unpleasant taste, such as a rancid taste, the flavor is also impaired, etc.

On the other hand, the UBD is an imperative deadline which is affixed to microbiologically perishable food products capable, after a short period of time, of presenting an immediate danger to human health.

For the purpose of the present disclosure, the expression "... bakery product (bread) ... free of artificial preservative (s) of the E200 range" means, for example, that the amount of added E200 chemical preservative(s) optionally present is so low (traces) that the E200 or E200s present is (are) inactive in terms of increase in the BBD. In other words, the concentration (expressed as baker's %) of chemical preservative(s) of the E200 range added to the bakery product (bread) is, for example, less than or equal to 0.1, preferably less than or equal to 0.01, and even more preferably less than or equal to 0.001.

Advantages

The method according to the invention is, from a technological point of view, simple to implement and with very low energy costs.

According to the intensity of the treatment, the [step (6)]/ingredients G-H combination makes it possible to destroy a broad spectrum of microorganisms.

The BBDs obtained by virtue of the invention, without additional chemical preservative such as those of the E200 range, are particularly noteworthy.

Step (6) according to the invention is an athermic decontamination method which makes it possible to preserve the organoleptic and nutritional qualities of the food products.

Step (6) according to the invention is a treatment of short duration, which can be readily integrated into a production line.

In addition, the apparatus producing the pulsed light is a compact and automated system.

Step (6) according to the invention is a clean method which does not produce any residue (waste, effluents, etc.).

Method According to the Invention

Particularly advantageously, during step (1), at least one of the following quantitative characteristics is used (the % data being baker's %: % by weight relative to the weight of flour A):

i. $0 \leq C \leq 30$, preferably $1 \leq C \leq 25$; and better still $2 \leq C \leq 20$;
ii. $0.1 \leq G \leq 10$, preferably $1 \leq G \leq 5$; and better still $2 \leq G \leq 4$;
iii. $0.05 \leq H \leq 5$, preferably $0.1 \leq H \leq 4$; and better still $1 \leq H \leq 4$;
iv. $0.05 \leq I \leq 5$, preferably $0.1 \leq I \leq 4$; and better still $0.15 \leq I \leq 3$.

In the bakery trade, it is common practice to express the amounts of the ingredients present in the dough as "baker's" percentages. The baker's percentage is a method of calculation in which the total mass of flour present in the formula of the baker's dough, i.e. in the final dough, always represents 100% and the mass of the other ingredients is calculated relative to this flour base. In the calculation of the baker's percentages, only the flour in the strict sense, in general mill-derived wheat flour, is taken into account as amount of flour related back to 100. The flour which goes to make up the fermented cereal flour and which forms the acid preferment, irrespective of the cereal or cereals, is not taken into account in the calculation, nor is the wheat gluten, which is, of course, vital gluten. Unless otherwise indicated, in the description of the invention hereinafter, the amounts of the ingredients of the baker's dough are expressed as baker's percentages.

The ingredients A, B, D, E (obligatory), F and J (optional) are conventional breadmaking ingredients which are used in proportions that are also known to those skilled in the art.

As regards the added fat(s) C, it (they) is (are) advantageously chosen from the group comprising rapeseed oil, palm oil, butter, margarine, soya oil, shortening and mixtures thereof.

Preferably, the fermentation agent D is chosen from the group comprising yeast, leavens and mixtures thereof.

As examples of suitable yeasts, mention may be made of the baker's yeast for industrial dough produced by cell multiplication of *Saccharomyces cerevisiae*, more particularly intended for methods for producing sandwich breads and melba toast.

As examples of suitable leavens, mention may be made of dry, pasty or liquid leavens.

The sugar(s) (F) used is (are) mainly sucrose, but it is also possible to use a glucose-fructose syrup.

Notably, the acid and/or acid salt of the breadmaking improver H is chosen from the group comprising:

acid preferments, preferably from the subgroup comprising dry leavens, pasty leavens or liquid leavens and mixtures thereof, edible acids, preferably from the subgroup comprising lactic acid, lactic acid salts, acetic acid, acetic acid salts, propionic acid, propionic acid salts, benzoic acid, benzoic acid salts, sorbic acid and sorbic acid edible salts, malic acid, malic acid salts, citric acid, citric acid salts, ascorbic acid, ascorbic acid salts, alginic acid, alginic acid salts and mixtures thereof;

and mixtures thereof.

According to one preferred embodiment of the invention, the breadmaking improver H is the one described in patent application FR-A-2 894 432.

Advantageously, the acid preferment of the improver H may be a dry leaven. The dry leaven corresponds to a dry product obtained by drying a paste fermented by means of microorganisms belonging to sourdough bacteria, and optionally by means of sourdough yeasts. Sourdough bacteria are in particular described in Chapter 4.2 of the reference book Handbuch Sauerteig—Biologie—Biochemie—Technologie by Spicher and Stephan, 4th edition (ISBN 3-86022-076-4). The dry leaven is also sold under the French trade names: farine fermentée, farine fermentée déshydratée, farine préfermentée or levain déshydraté, under the English trade names: dry or dried sourdough, dry or dried leaven or levain, dry or dried fermented flour, dry or dried prefermented flour, sourdough concentrate, sourdough powder and sour flour, and under the German names Trockensauer and Sauerteigpulver. The dry leaven present in the improver according to the invention may be derived from a fermented dough comprising one or more cereal flours, comprising one or more bran-rich milling products or comprising a mixture of one or more cereal flour(s) with one or more bran-rich milling product(s), it being possible for this dough to also contain cereal germs. Preferably, the dry leaven is derived from a fermented dough comprising wheat flour and/or rye flour, one or more bran-rich milling product(s) originating from wheat and/or one or more bran-rich milling product(s) originating from rye or a combination of wheat flour(s) and/or of rye flour(s) with one or more bran-rich milling product(s) originating from wheat and/or from rye. The dough may also contain ground wheatgerm.

These dry leavens obtained by dehydration or drying no longer contain any active microorganisms, but they still contain a large part of the flavors formed during the fermentation of the leaven by the bacteria of the leaven and possibly also the yeasts of the leaven, these flavors being mainly lactic acid, but also the other flavors from the fermentation of the leaven.

The dose of lactic acid in the dry leaven is advantageously greater than or equal to 50 g per kg of dry leaven, and more advantageously at least 70 g per kg of dry leaven, and even more advantageously at least 100 g per kg of dry leaven.

According to one variant, the acid preferment of the improver H may be a liquid preferment, for instance a leaven as described in EP 0953 288 and WO 2004/080187.

According to one embodiment, the liquid leaven of the improver H consists of a flour-based culture medium containing at least one cereal flour and water, said culture medium being inoculated and fermented with a selection of microorganisms which can advantageously comprise lactic acid bacteria. Said microorganisms are capable of synthesizing one or more acids chosen from the group comprising edible organic acids, the edible salts of said acids and combinations thereof, in particular combinations of said acids, of said organic salts or of one or more of said acids with one or more of said organic salts. In the present context, the expression "flour-based culture medium" denotes a culture medium of which the dry matter content has, as main ingredient, one or more cereal flours. The liquid leaven according to the invention contains at least 7 g/l of acetic acid, and optionally lactic acid. The liquid leaven according to the invention has a pH of between 3.8 and 4.5.

According to another variant, the liquid leaven of the improver H consists of milk or its derivatives fermented by microorganisms and containing organic acids and/or salts thereof.

According to another variant, the acid preferment of the improver H may be a pasty leaven. A pasty leaven is, for example, a leaven as defined in chapter 10 in the book by Raymond Calvel "The taste of bread", Aspen Publishers, Inc., Gaithersburg, Md., 2001, ISBN No.: 0-8342-1646-9.

The acid and/or the acid salt of the improver H is any acid and/or acid salt which has a capacity for improving breadmaking. This capacity may be an acidifying, preserving, antioxidant, thickening or gelling capacity.

The salts are preferably edible salts. For example, the acid salts may be the following: potassium sorbate, calcium sorbate, potassium propionate, calcium propionate, sodium propionate, potassium acetate, calcium acetate, sodium acetate, potassium lactate, calcium lactate, sodium lactate, potassium malate, calcium malate, sodium malate, potassium citrate, calcium citrate, sodium citrate, ammonium citrate, sodium ascorbate, calcium ascorbate, sodium alginate, potassium alginate, ammonium alginate, calcium alginate.

The solid breadmaking improver H comprising an acid and/or acid salt, preferably an acid preferment, in combination with glucono-delta-lactone, has, for example, a dry matter content of at least 85% by mass. The improver may in particular have a dry matter content of greater than or equal to 90% by mass, and more preferably greater than or equal to 94% by mass. The preferred form of the improver H is the dry form. According to a more preferred form, the dry form may be pulverulent or in the form of granules. The granular form has the advantage of being less dusty and of having a lower tendency to become dispersed in the air.

The mean diameter of the particles of the improver is preferably between 50 pm and 300 pm, more preferably between 80 pm and 150 pm, and more preferably between 80 pm and 120 pm.

According to one embodiment of the invention, the improver may also be liquid, pasty or semi-moist according to its dry matter content.

According to one preferred embodiment of the present invention, the acid preferment is separated from the GDL during its storage.

One of the means of separation is the separate packaging of the GDL. In this case, the incorporation is carried out either simultaneously by mixing the GDL with the acid preferment before addition to the kneader, or separately by adding each of the two constituents individually.

When the acid preferment and the glucono-delta-lactone are introduced separately over time, the period of time separating the incorporation is adjusted so that the GDL can act on the rheological disadvantages of the acid preferment.

Another means of separation is to encapsulate the GDL in order to maintain its functional properties up to its action in the dough. Two types of encapsulation methods can be used: physicochemical methods, for instance coacervation or solvent evaporation, and mechanical methods, for instance fluidized airbed, hot or cold nebulization, extrusion and centrifugation. All the food-compatible encapsulation carriers may be envisioned for the encapsulation of the GDL, for instance carbohydrates: maltodextrins, modified starches, cyclodextrins, sucrose, cellulose, etc.; gums: algal extracts, gum arabic, guar, etc.; lipids: hydrogenated or nonhydrogenated vegetable and animal fats, waxes, lecithins, etc.; proteins: gelatin, etc.

According to a particularly preferred embodiment, the fluidized-bed coating technique is used. It consists in spraying a coating product onto solid particles fluidized in an air stream. A wide variety of coating products can be used: cellulose derivatives, dextrins, emulsifiers, lipids, protein derivatives, modified starches. When the improver is in liquid, pasty or semi-moist form, the coating is water-insoluble, and the release of the GDL occurs through a mechanical action during the kneading of the dough. When the improver is in the dry form, all the encapsulation and coating carriers may be envisioned.

Preferably, in the present invention, the GDL is used at between 0.05% and 5%, more preferably between 0.1% and 3%, and more preferably between 0.1% and 1.5% as baker's percentages.

Preferably, the low-sodium mixture I of minerals, preferably derived from milk, is even more preferably chosen from the group of low-sodium mineral mixtures obtained by fractionation of milk. Preferably, said low-sodium mixture of minerals has the following composition:

| % proteins | 10-15 |
|---|---|
| % ash | 80-88 |
| Minerals | g/100 g |
| Na | 8-12 |
| K | 27-30 |
| Cl | 40-45 |
| Ca | 2-3 |
| Mg | 0.2-0.4 |
| % moisture | 3-5 |
| % lactose | 5-10 |

Said low-sodium mixture of minerals is advantageously used to increase the durability of the product according to the present invention.

In one most particularly preferred embodiment, the invention also comprises said mixture I, this making it possible to obtain an optimum BBD. Specifically, the preferred embodiment of the invention, which makes it possible to obtain particularly advantageous BBD results, consists in combining physical surface decontamination by means of pulsed light, with the ingredients G, H and I, among others, in this industrial breadmaking method.

According to an advantageous arrangement of the invention, the additive(s) J is (are) chosen from additives for improving the softness (preferably, emulsifiers, thickeners, hydrocolloids), stabilizers; technological additives (preferably oxidants, enzymes (advantageously, alpha-amylase), cereal flours or other ingredients characteristic of the composition of special breads, reducing agents], microbiological preservation additives from the group comprising: ascorbic acid, L-cysteine or deactivated yeast, and mixtures thereof.

As examples of stabilizers-thickeners, mention may be made of: pregelatinized flour, modified starches, CMC (carboxymethylcellulose), gums, for instance xanthan gum, algal extracts such as alginates or carrageenates.

As examples of emulsifiers, mention may be made of: lecithin, fatty acid mono- and diglycerides, or diacetyltartaric esters of fatty acid mono- and diglycerides.

As examples of enzymes, mention may be made of: amylases, and in particular alpha-amylases, including, for example, maltogenic alpha-amylases or other antistaling alpha-amylases, hemicellulases, and in particular xylanases, glucose oxidases, amyloglucosidases, phospholipases.

Other examples of additives J are L-cysteine monohydrochloride, calcium chloride, and the oxidants and reducing agents of the dough.

Step (1) of preparing the dough comprises kneading, which is a unitary operation which is aimed at mixing the mixture of the ingredients A to J (inter alia) in order to obtain a homogeneous mixture. The kneading of the dough is also aimed at forming a structure of foam type (incorporation of air into the matrix). The intensity of the kneading increases the inclusion of air, which prefigures the structure of the crumb. The kneading also has a texturing role, i.e. a role of organization, bonds and interlacing between the various components.

The shaping step (2) comprises various operations, namely in particular, and for example, dividing, rounding and molding.

The dividing is aimed at dividing up the kneaded dough so as to obtain dough pieces of the same weight.

All these operations are characterized by the shaping of the dough pieces before the fermentation step. The shaping comprises, for example, successive active working phases which create tensions in the dough (rounding, rolling, folding). Added to this are resting phases (slackening or relaxation) which enable the dough to become flexible again. In addition, to finish the shaping, there is the step of forming of the dough pieces.

The fermentation step (3) is an important operation in the method for producing breads. During the fermentation, it is necessary to distinguish the microbiological aspects (activities of the yeasts and bacteria making up the leaven) and the biochemical aspects associated with the fermentation (amylolysis, mechanisms of oxidation, formation of aromatic compounds, etc.) and the action of development of the dough, linked to the production and retention of gas and also to the strength of the dough.

The fermentation process occurs in two stages:
Preformentation, which is a period of first fermentation in bulk, the objective of which is to allow the dough to strengthen and allow the structure of the dough to improve, promoting gas retention. Its role is favorable to the development of aromatic compounds and to increased acidity.
A period of second fermentation which takes place after the forming, the aim of this second fermentation being to bring the dough piece to a state of optimum development before it is placed in the oven, while at the same time having sufficient stability.

According to one variant, the fermentation (3) can be activated by exposure of the dough to a microwave source, with an emission power such that the increase in temperature induced at the heart of the dough is less than or equal to the yeast inactivation temperature, the temperature induced at the heart of the dough for this microwave activation preferably being between 30° C. and 50° C., and even more preferably between 36 and 42° C., the hygrometry being, for its part, preferably between 60% and 99% ERH (equilibrium relative humidity) and even more preferably between 70% and 95% ERH. This microwave activation phase is advantageously carried out simultaneously with a conventional fermentation in a chamber climatized with respect to temperature (25 to 50° C., preferably 30° C. to 42° C.) and with respect to humidity (60% to 90% ERH, preferably 70% to 95% ERH). Advantageously, the phase of fermentation activation by microwave exposure can make it possible to reduce the duration of the fermentation phase, for example by 25% to 75%. For example, for a dough piece weighing between 600 and 700 g, the duration Df of this phase of fermentation activation by microwave exposure (expressed in minutes) is between 10 and 50, preferably between 10 and 35, and even more preferably between 15 and 25.

The baking (4) results from an exchange of heat between the atmosphere of the convection oven and the product to be baked. This operation is characterized by an expansion and a physicochemical transformation of the dough as a result of the action of the heat. The baking improves the organoleptic qualities of the breads and gives them a better ability to be stored and also a better digestability than unbaked doughs. The baking is an operation which lasts between 30 and 38 minutes, the baking temperature in the oven is 240° C.-260° C., these parameters making it possible to reach a temperature of 99° C. at the heart of the product. The humidity in the oven is 35-41% in order to limit drying of the products during the baking. The baking should be an operation that is well controlled so as to ensure the formation of a thin crust and a degree of drying that is quite limited so as to promote the softness characteristics.

According to one variant, the baking step (4) is carried out at least partly using a microwave oven, preferably in such a way that:
⇒ total power of between 70 Wh/kg and 110 Wh/kg, preferably between 75 and 85 Wh/kg, is used,
⇒ and, advantageously, a phase 1 of baking the dough contained in the mold by means of microwaves with a nominal power P1 is carried out:
  such that the emission power Pe1 (expressed in watts/min/gram of dough) is between $10^{-3}$ and $10^{-1}$, preferably between $1\times10^{-2}$ and $5.5\times10^{-2}$, and even more preferably between $1.5\times10^{-2}$ and $3\times10^{-2}$,
  or such that the emission power Pe1 (expressed in watt hours/kilogram of dough) is between 10 Wh/kg and 40 Wh/kg, and even more preferably between 12 Wh/kg and 30 Wh/kg;
⇒ and a phase 2 of baking by means of microwaves with a nominal power P2 is then carried out:
  such that the emission power Pe2 (expressed in watts/min/gram of dough) is between $10^{-3}$ and $10^{-1}$, preferably between $1\times10^{-2}$ and $8.5\times10^{-2}$, and even more preferably between $1.5\times10^{-2}$ and $7\times10^{-2}$;
  or such that the emission power Pe2 (expressed in watt hours/kilogram of dough) is between 30 Wh/kg and 100 Wh/kg, and even more preferably between 55 and 75 Wh/kg;
given, moreover, that P1≤P2.

This microwave baking can advantageously be carried out:
  either in static "batch" mode using a microwave oven in which the bakery products are put in the oven in batches and in sequences,
  or in dynamic (continuous) mode, for example using a tunnel microwave oven in which the bakery products continuously circulate at a given speed by virtue of conveying means.

In the static mode, the duration of the heating/baking phases is, with the emitted power, an important variable.

Advantageously in the static mode, the duration D1 of microwave heating/baking phase 1 is less than or equal to the duration D2 of microwave heating/baking phase 2.

For example, for a dough piece weighing between 600 and 700 g, the duration D1 of this microwave heating phase 1 (expressed in seconds) in the static mode is between 60 and 300, preferably between 20 and 90, more preferably between 25 and 60, and even more preferably between 30 and 40, while the duration D2 of this baking phase 2 expressed in seconds is, in increasing order of preference: between 30 and 180, between 30 and 160, between 30 and 150, between 60 and 120, between 65 and 120 and between 60 and 90.

In the dynamic mode, the duration of the heating/baking phases is dependent on the speed at which the bakery products are conveyed in the tunnel oven.

Moreover, still in the dynamic mode, it does appear to be preferable to adjust essentially the conveying speed variable and the emitted power variable in various successive zones of the tunnel oven corresponding to the baking/heating phases in order to control the heating/baking of the bakery products.

In the dynamic mode, the durations of transit D1, D2 of the bakery products in the various successive zones of the tunnel oven corresponding to the baking/heating phases are, for example, substantially of the same order. It is Pe which varies in these zones.

The microwave baking (4) may comprise another, advantageous, additional step, namely a baking phase 3, by means of microwaves with an emission power Pe3:
  such that the emission power Pe3 (expressed in watts/min/gram of dough) is between $10^{-3}$ and $10^{-1}$, preferably between $1\times10^{-2}$ and $3\times10^{-2}$, and even more preferably between $1.5\times10^{-2}$ and $2.5\times10^{-2}$;
  such that the emission power Pe3 (expressed in watt hours/kilogram of dough) is between 15 Wh/kg and 75 Wh/kg, and even more preferably between 30 and 40 Wh/kg;
given, moreover, that P1≤P2 and preferably Pe1≤Pe2≤Pe3.

The nominal set power P3 may be such that P2≤P3 or P3≤P2, preferably P2≤P3.

In any event, the sum of the powers emitted by these three baking phases is advantageously less than the total power between 70 Wh/kg and 110 Wh/kg, preferably between 75 Wh/kg and 85 Wh/kg.

The optional cooling step (5) which follows the baking is advantageously preceded by another optional step, of demolding (5').

Demolding allows the breads to cool more rapidly. The cooling is, for example, carried out in cooling towers where the air is filtered. In practice, the breads can be placed in the cooling tower for, for example, 2 to 5 hours.

Preferably, the bread cooling step (5) brings the temperature of the bread to at most 40° C., preferably at most 20° C.

According to one preferred embodiment, in step (6) of decontaminating the bread by pulsed-light treatment, each bread is subjected to at least one flash, preferably one or two, produced by one or more lamps, such that the level of energy received per unit of treated surface area ($cm^2$) of bread is greater than or equal to 0.5 $J/cm^2$, preferably greater than or equal to 0.7 $J/cm^2$, and even more preferably greater than or equal to 0.8 $J/cm^2$, and less than 3.0 $J/cm^2$, or else between 0.5 $J/cm^2$ and 5 $J/cm^2$.

Variations in measurement of the level of energy may exist depending on the sensitivity of the measuring instruments used. This is illustrated by the examples below.

The principle of the destruction of the microorganisms is based on the synergy of action between the photochemical effect (pulsed UV) and the photothermal effect (instantaneously reach a temperature of between 160° C. and 200° C.).

The flash lamps (for example, xenon) used to produce the pulsed light are devices which emit large amounts of spectral energy in pulses of short duration. The energy accumulates in a storage capacitor. The capacitor is connected across the two main electrodes of the flash lamp, called anode and cathode. The voltage to which the capacitor is charged is generally lower than that which would cause ionization of the xenon gas in the lamp. The energy released and dissipated forms a highly excited xenon plasma within the flash lamp. The process which causes the initial ionization of the gas is known as "triggering". The triggering creates a voltage gradient (volts/mm) in the gas of sufficient magnitude to cause ionization. The ionization of the xenon gas causes light radiation of strong intensity covering a wide spectral range from ultraviolet to infrared. This radiation, when it comes into contact with the surface to be treated, will have a germicidal effect on the microorganisms contaminating the surface.

Several triggering methods exist, including the simmer mode and the pseudo-simmer mode.

In the simmer mode, the lamp needs to be triggered only once in a sequence of flashes. A separate power supply with specific load characteristics has been designed so as to force the current to continue flowing in the lamp in a low, but stable state of ionization.

The pseudo-simmer mode is a variation on the simmer mode that combines the simmer power supply with the capacitor charging supply. Operating conditions are limited by lamp and power supply load line considerations.

Advantageously, the high-energy radiation emitted for step (6) is produced in the "pulse" mode over a spectral band predominantly between, for example, 180 and 1100 nm.

According to one preferred embodiment, the breads treated in step (6) circulate on conveying means and the process is carried out in such a way that at least one of the following arrangements is implemented for step (6):
  the space between two successive breads is sufficient to enable the lamps, after the production of one or more flashes for a given bread, to be once again operational for the production of one or more flashes for the following bread,
  the breads are all positioned in substantially the same way relative to the lamps when they are subjected to the flash(es).

In practice, the treatment of step (6) is carried out, for example, in a decontamination tunnel or chamber, which makes it possible to isolate the breads, subjected to the flashes, from the outside and in particular from the operators for obvious safety reasons.

It is therefore necessary to adjust the speed of the conveyor belt and the frequency of the flashes in such a way as to comply with the abovementioned operating requirements.

According to a notable mode of the invention, the bread can lie on a support which is transparent to the light of the flash(es), when it is subjected to said flash(es) and, moreover, all or some of the lamps envisioned are placed less than 10 cm, preferably less than 5 cm, from the bread.

In practice and for example in the case where the bread is a sandwich bread of substantially parallelepipedal general shape, the pulsed-light treatment of step (6) simultaneously targets at least three faces of the bread (the two side faces and the upper face).

It should be noted that the method according to the present invention makes it possible to obtain very satisfactory results with a limited flash number (preferably one to three flashes) and fluence thresholds which are clearly lower than those performed in the prior art.

The optional step (7) is preferably carried out after the decontamination (6).

The packaging step (8) comprises packaging, for example in protective plastic bags, boxing and palletizing so as to facilitate transport.

Product According to the Invention

Surprising and unexpectedly, the BBD of the factory-produced bakery product according to the invention can, in practice, be greater than or equal to 35 days, preferably without artificial preservative of E200 type, or decontamination by spraying an ethanol-based liquid, at least on all or part of the surface of said product. It may, for example, be between 35 and 50 days.

According to one advantageous embodiment, the factory-produced bakery product according to the invention has at least one of the microbiological characteristics MC1 to MC8 given in the table hereinafter:

| Microbiological characteristics | Type of microorganism | Maximum level accepted | Method of analysis |
| --- | --- | --- | --- |
| MC1 | Total mesophilic flora | ≤$10^5$ CFU/g | NF V 08-100-01/01 |
| MC2 | E. coli | ≤10 CFU/g | NF V 08/053 |
| MC3 | Thermotolerant coliforms | ≤10 CFU/g | NF V 08-060-03/96 |
| MC4 | Staphylococcus aureus | ≤100 CFU/g | NF V 08-057-1-01/04 |
| MC5 | Yeasts | ≤500 CFU/g | NF V 08-036-05/03 |
| MC6 | Molds | ≤500 CFU/g | NF V 08-036-05/03 |
| MC7 | Pichia anomala | ≤100 CFU/g | Identification with Vitek/Api strips then NF V08-036-05/03 |
| MC8 | Salmonellae | Absence in 25 g | SMS AES 10/4-05/04 |

The microorganisms which are sought during these analyses are naturally present on the production sites, in the atmosphere, in the ingredients, etc.

The acronym CFU means Colony Forming Unit.

The methods of analyses are in accordance with the NF (French standards) and SMS (Simple Method for Salmonella) standards identified above.

Preferably, the factory-produced bakery product according to the invention, on the one hand, comprises at least one filler chosen from hydrogenated monosaccharides and/or oligosaccharides, preferably from the group comprising: hydrogenated isomaltulose, lactitol, maltitol, erythritol, xylitol, mannitol, sorbitol and mixtures thereof, maltitol being preferred, and at least one breadmaking improver comprising an acid and/or acid salt and glucono-delta-lactone (GDL), and, on the other hand, is decontaminated by pulsed-light treatment.

Preferably, the factory-produced bakery product according to the invention has all or some of the following properties:
  softness: satisfactory
  visual appearance: product does not exhibit any microbial development, with a crust typical of bread products
  texture: crumb which is fine and regular, soft and noncrumbly
  smell: characteristic of a bread product, without any foreign smell
  taste: characteristic of a bread product, no foreign taste.

Even more preferably, the factory-produced bakery product according to the invention is characterized in that it comprises the following ingredients:
A. flour;
B. water;
C. optionally, added fat(s);
D. at least one fermentation agent;
E. NaCl (salt);
F. optionally, sugar (sucrose);
G. at least one filler chosen from hydrogenated monosaccharides and/or oligosaccharides, preferably from the group comprising: hydrogenated isomaltulose, lactitol, maltitol, erythritol, xylitol, mannitol, sorbitol and mixtures thereof, maltitol being preferred;
H. at least one breadmaking improver comprising an acid and/or acid salt and glucono-delta-lactone (GDL);
I. optionally, at least one low-sodium mixture of minerals, preferably derived from milk;
J. optionally, one or more additives.

The factory-produced bakery product according to the invention is preferably obtained by means of the method according to the invention. In one preferred variant embodiment, the factory-produced bakery product according to the invention comprises at least the ingredients G, H and I mentioned above.

Device According to the Invention

The invention also relates to an industrial device for producing decontaminated bakery products, in particular sandwich breads or the like, suitable in particular for implementing the method according to the invention, characterized in that it comprises at least one pulsed-light system for decontaminating bread, comprising one or more lamps capable of producing, preferably simultaneously, at least one flash.

Preferably, all or some of the lamps envisioned are advantageously placed less than 10 cm, preferably less than 5 cm, from the bread.

In addition, this pulsed-light system for decontaminating bread can comprise at least one support which is transparent to the light of the flash(es) and on which the bread lies when it is subjected to said flash(es). This arrangement makes it possible in particular, in the case where the bread has a parallelepipedal general shape, to treat at least three faces of the bread.

According to another advantageous particularity of the invention, the system used for the pulsed-light surface treatment is composed of two subassemblies: a treatment tunnel or a treatment chamber and the power cabinet.

The treatment tunnel or the treatment chamber advantageously inserts into an industrial bread production line. This tunnel or chamber, designed so as to be light proof, is composed, for example, of:
  one to ten lamps uniformly distributed at the periphery of the chamber,
  a quartz tube,
  aluminum reflectors,
  a quartz support on which the products to be treated are placed.

The power cabinet contains the components which serve to produce high-intensity and high-voltage electrical pulses in order to generate the light yield of the lamps distributed in the decontamination airlock. The power cabinet contains, e.g.:
  one to ten electrical power supplies,
  one to ten capacitors,
  one electrical distribution unit.

The attached FIG. 1 represents schematically a front view of the distribution of the lamps in the chamber of the pulsed-light system. This figure shows, from the front, a parallelepipedal sandwich bread 1 comprising two side faces 2, 3, an upper face 4 and a lower face 5 lying on a support 6 (for example, transparent made of quartz). Eight lamps 7, each combined with a reflector 8, are distributed uniformly, facing the side faces 2, 3 and the upper face 4. Two superimposed lamps 7/reflectors 8 combinations are arranged so as to illuminate each of the side faces 2, 3, while four lamps 7/reflectors 8 combinations are arranged side-by-side so as to illuminate the upper face 4. The lamps 7/reflectors 8 combinations are, moreover, preferably substantially arranged in the same plane perpendicular to the support 6 and transverse relative to the bread 1. Irrespective of the static or dynamic mode of treatment, it is preferable for the flashes to occur when the median transverse plane of the bread 1 is substantially in line with the plane comprising the lamps 7/reflectors 8 combinations.

The pulsed-light system can, for example, have the following characteristics and performance levels:
  Fluence: 1 to 2.5 J/cm$^2$;
  Maximum pulse frequency: 1.5 Hz;
  Pulse duration at 30%: 0.4-0.6 mseconds;
  Arc length: 500 nm;
  Xenon gas;
  Forced air cooling.

The examples which follow make it possible to understand the role of the invention more clearly, and illustrate exemplary embodiments of the method according to the invention.

EXAMPLES

The doughs used in the examples which follow have the following compositions:

TABLE 1

| Ingredients | Control recipe | Recipe according to the invention without chemical preservative |
|---|---|---|
| -A- Wheat flour | 100 | 100 |
| -B- Water | 55 | 55 |
| -C- Palm oil | 3 | 5 |
| -D- Baker's yeast | 4 | 4 |
| -E- Salt (NaCl) | 2.2 | 2 |
| -F- Sugar (sucrose) | 2 | 5 |
| -G- Maltitol | 2 | 3 |
| -H- Dry acid leaven as described in EP 0 953 288 and WO 2004/080187, and GDL | | 3 |
| -I- Low-sodium mixture of minerals described on page 12 of the present patent application | | 0.2 |
| CPP | 0.6 | |
| Breadmaking improver: wheat flour, ascorbic acid: 1.5% | 0.25 | 0.25 |

Control recipe sandwich breads and sandwich breads with a recipe according to the invention without added chemical preservatives are produced in the laboratory. These breads were produced in molds, and then sliced and bagged. Certain breads are contaminated by manual spraying of *Aspergillus flavus* spores and using a mask having an opening of 6 cm×6 cm. The contaminated breads are treated with pulsed light the day after they were contaminated. All the contaminated or uncontaminated control and test products are placed in storage at 30° C. for monitoring under these conditions. Minimum shelf life expectancy: 30D (days) for treated products.

The preparation of this dough comprises the following steps:
  kneading in a "spiral" kneader, 4 min at slow speed then 10 min at fast speed,
  forming in the shape of a quenelle 30 cm long and placing in a mold,
  fermentation in a climatized incubator (85% humidity and temperature 35° C.).

The mold used is parallelepipedal in shape and has the following dimensions: 300 mm long at the top, 285 mm at the bottom; 85 mm high, 10 cm wide at the bottom and 11 cm at the top.

The amount of dough per mold is 660 g.

The equipment used for the baking is a conventional Canadian-type oven.

The pulsed-light system used is represented on the attached FIG. 1.

All the breads were treated out of their bag, said bag filtering the radiation too much and creating shadow zones.

The fluences measured at the surface of the breads using a joulemeter are between 0.9 and 4.7 J/cm$^2$. The fluence can be measured on each lamp separately and the values obtained after three successive flashes are given in table 2 below:

TABLE 2

| Fluence measurements on upper lamp (J/cm$^2$) | | Fluence measurements on front lamp (J/cm$^2$) | | Fluence measurements on rear lamp (J/cm$^2$) | |
|---|---|---|---|---|---|
| Measurement with Molectron ® calorimeter | Measurement with Gentec Solo2 ® calorimeter | Measurement with Molectron ® calorimeter | Measurement with Gentec Solo2 ® calorimeter | Measurement with Molectron ® calorimeter | Measurement with Gentec Solo2 ® calorimeter |
| Nominal voltage at 4750 V (without simmer mode) | | | | | |
| 1.33 | 3.58 | 1.66 | 3.82 | 1.507 | 3.17 |
| 1.53 | 3.51 | | 3.73 | | 4.63 |
| 1.58 | 3.53 | | 3.77 | | |
| | 3.63 | | 4.69 | | |
| | 3.08 | | | | |
| | 2.04 | | | | |
| Nominal voltage at 5000 V (without simmer mode) | | | | | |
| 1.429 | 3.46 | 1.893 | 4.25 | 1.66 | 3.59 |

Tests

TABLE 3

Summary of the tests

| Test | Type of bread | Contamination | Treatment/light |
|---|---|---|---|
| 1 comp | Control sandwich bread | Yes | 2 flashes |
| 2 comp | Control sandwich bread | Yes | No |
| 3 comp | Control sandwich bread | No | 2 flashes |
| 4 comp | Control sandwich bread | No | No |
| 5 | Sandwich bread according to the invention | Yes | 2 flashes |
| 6 | Sandwich bread according to the invention | Yes | No |
| 7 | Sandwich bread according to the invention | No | 2 flashes |
| 8 | Sandwich bread according to the invention | No | No |

Observations During the Handling:

The breads made with the recipe according to the invention without chemical preservative have a crust surface which is slightly darker than that of the breads according to the control recipe.

Results of the Microbiological Analyses:

The breads, once treated, were sent for analysis of three microorganisms. Each position on the bread was pinpointed before analysis.

Results Obtained

| Name | Mesophilic aerobic flora | Yeasts | Molds |
|---|---|---|---|
| 1 | <2000 n/cm$^2$ | <10 n/cm$^2$ | 20 n/cm$^2$ |
| 2 | <2000 n/cm$^2$ | <10 n/cm$^2$ | 260 n/cm$^2$ |
| 3 | <2000 n/cm$^2$ | <10 n/cm$^2$ | <10 n/cm$^2$ |
| 4 | <2000 n/cm$^2$ | <10 n/cm$^2$ | <10 n/cm$^2$ |
| 5 | <2000 n/cm$^2$ | <10 n/cm$^2$ | 80 n/cm$^2$ |
| 6 | <2000 n/cm$^2$ | <10 n/cm$^2$ | 170 n/cm$^2$ |
| 7 | 2000 n/cm$^2$ | <10 n/cm$^2$ | <10 n/cm$^2$ |
| 8 | <2000 n/cm$^2$ | <10 n/cm$^2$ | 10 n/cm$^2$ |

Observations:

No difference in contamination is observed on the noncontaminated products, whether or not they were treated with pulsed light, the baseline contamination level being less than the limits of measurement.

On the contaminated products, it is observed that the contamination with the molds according to the invention is reduced by a factor of 2 by the pulsed-light treatment.

A biological validation test was carried out on breads made with the recipe according to the present invention and using pulsed-light treatment equipment, this time comprising three lamps, corresponding to the following treatment conditions:

Voltage: 4750 V

Frequency: 700 ms (i.e. 2 flashes per bread)

Light pulse duration: 450 µs

The three lamps emitted cascade flashes.

The biological validation is carried out in the following way:

placing of the bioindicators on supports on the three faces of the sandwich breads (front, rear, upper) and at three different levels over the length of the sandwich bread, the sandwich breads with bioindicators are placed at the entry of the decontamination tunnel in order to undergo the pulsed-light treatment, after treatment, the bioindicators are recovered, and placed in sterile tubes for microbiological analysis.

The measurement consists in detecting the presence of survivors in populations of target microorganisms used:

*Aspergillus niger* IP 1431-93 at the concentration: 5.4×10$^4$ spores per microorganism carrier,

*Bacillus atropheus* (subtilis) ATCC 9372 at the concentration: 1.1×10$^4$ spores per microorganism carrier.

Figure 6:
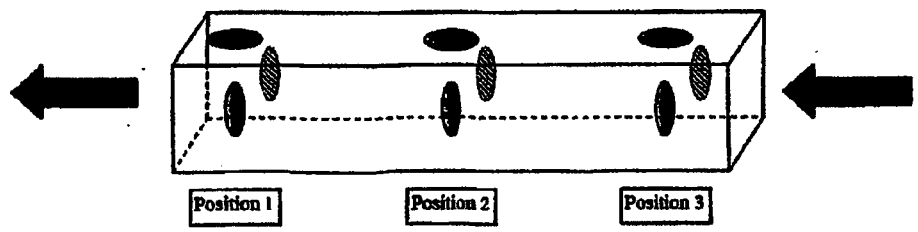
FIG. 6 is a scheme showing the three positions of the nine bioindicators placed on the three faces of the sandwich breads for biological validation after treatment according to the invention.

Positioning of the bioindicators on the sandwich breads measuring 63 cm in length:

The bioindicators are distributed along the sandwich breads at three bioindicators per face (front, rear, top). The three faces are tested simultaneously (dynamic tests). The attached FIG. 6 shows the three positions of the nine bioindicators placed on the sandwich bread. The arrows represented on this FIG. 6 give the direction of passing through the treatment zone.

Results Obtained

*Aspergillus niger* IP 1431-83 biological indicators

| Samples treated | | Number of spores/support | Nontreated controls | Number of spores/support | Reduction |
|---|---|---|---|---|---|
| Rear face | Position 1 | <1 | T1 | $2.8 \times 10^4$ | >4 log |
| | Position 2 | <1 | T2 | $2.7 \times 10^4$ | >4 log |
| | Position 3 | <1 | T3 | $3.2 \times 10^4$ | >4 log |
| Upper face | Position 1 | <1 | T4 | $2.1 \times 10^4$ | >4 log |
| | Position 2 | <1 | T5 | $2.6 \times 10^4$ | >4 log |
| | Position 3 | <1 | T6 | $2.0 \times 10^4$ | >4 log |
| Front face | Position 1 | <1 | T7 | $2.2 \times 10^4$ | >4 log |
| | Position 2 | <1 | T8 | $2.4 \times 10^4$ | >4 log |
| | Position 3 | <1 | T9 | $3.2 \times 10^4$ | >4 log |

*Bacillus atropheus* (subtilis) ATCC 9372 biological indicators

| Samples treated | | Number of spores/support | Nontreated controls | Number of spores/support | Reduction |
|---|---|---|---|---|---|
| Rear face | Position 1 | 1 | T1 | $1.1 \times 10^4$ | 4 log |
| | Position 2 | 1 | T2 | $8.4 \times 10^4$ | 4 log |
| | Position 3 | <1 | T3 | $1.1 \times 10^4$ | 4 log |
| Upper face | Position 1 | $4.8 \times 10^1$ | T4 | $1.2 \times 10^4$ | 2.37 log |
| | Position 2 | <1 | T5 | $1.2 \times 10^4$ | 4 log |
| | Position 3 | <1 | T6 | $1.2 \times 10^4$ | 4 log |
| Front face | Position 1 | 1 | T7 | $1.4 \times 10^4$ | 4 log |
| | Position 2 | <1 | T8 | $1.1 \times 10^4$ | 4 log |
| | Position 3 | <1 | T9 | $1.1 \times 10^4$ | 4 log |

Observations

These dynamic tests show that the pulsed-light decontamination treatment has good effectiveness. Specifically, this treatment makes it possible to achieve a logarithmic reduction of 3 to 4 log on the *Bacillus atropheus* (subtilis) (ATCC 9372) and *Aspergillus niger* (IP 1431-83) populations.

Figure 2:
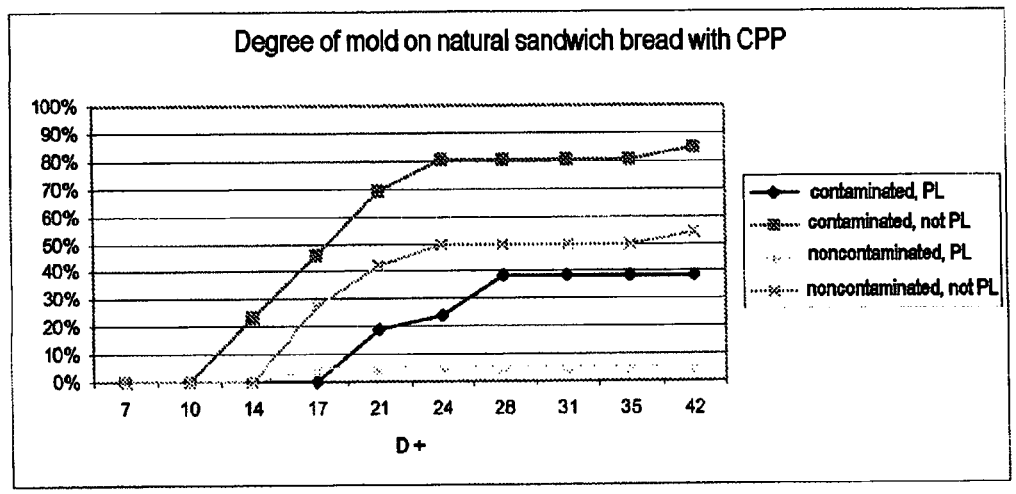
FIG. 2 gives the curve of the percentage of natural sandwich breads with chemical preservative (namely, calcium propionate —CPP—) having gone moldy over time.

Results of the Storage Monitoring:

FIG. 2 gives the curve of the percentage of control sandwich breads having gone moldy over time, with comparison of control products and products treated with two pulsed-light (PL) flashes. It is observed on this FIG. 2 that the pulsed-light treated, contaminated control sandwich breads develop molds one week later than the nontreated products. These products exhibit a degree of mold of approximately 40% which is stable from D+28 onward. The nontreated products go moldy from D+10 onward, do not stabilize their degree of mold before D+24 and exhibit a final degree of mold of close to 90%, i.e. twice as high as the products treated with pulsed light. It is also observed that the noncontaminated control sandwich breads treated with pulsed light develop only a very small degree of mold, of 5%, obtained at D+17. The noncontaminated, nontreated products go moldy at the same date, but obtain a final degree of mold of approximately 50%, i.e. ten times higher than the products treated with pulsed light.

Figure 3:
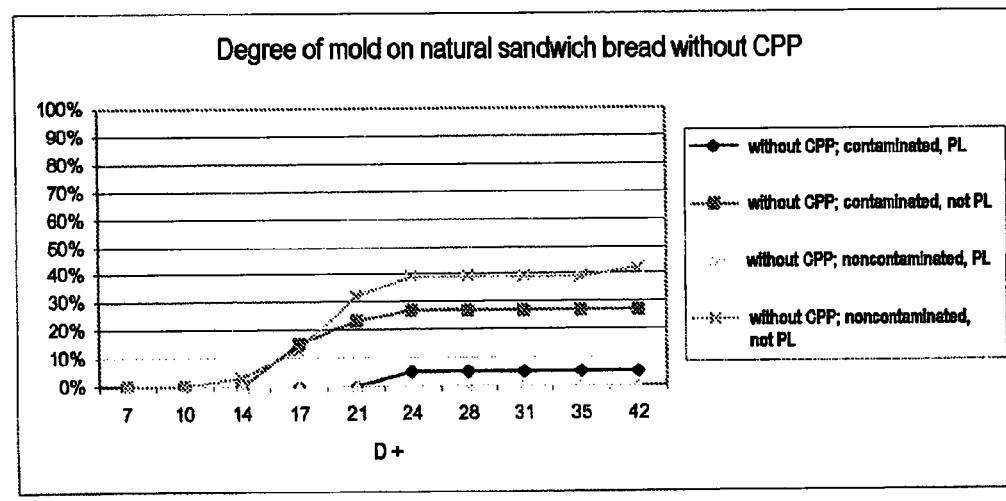
FIG. 3 gives the curve of the percentage of natural sandwich breads without chemical preservative having gone moldy over time.

FIG. 3 gives the curve of the percentage of sandwich breads according to the invention without CPP having gone moldy over time, with comparison of control products and products treated with two pulsed-light (PL) flashes. It is observed, on FIG. 3, that the nontreated, contaminated, sandwich breads according to the invention without CPP develop a degree of mold of approximately 30% at D+24. After treatment, a decrease in the degree of mold so as to reach 5% is observed. The nontreated, noncontaminated sandwich breads according to the invention without CPP develop a degree of mold of approximately 40% at D+24. After treatment, no appearance of moldy products is observed.

Figure 4:
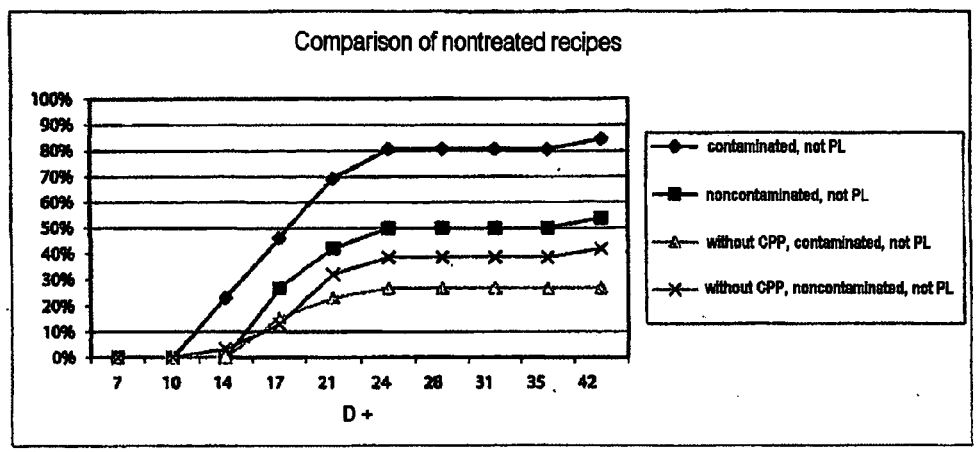
FIG. 4 gives the curve of the percentage of untreated wheat sandwich breads having gone moldy over time.

FIG. 4 gives the curve of the percentage of nontreated wheat sandwich breads having gone moldy over time, with comparison of control sandwich breads and sandwich breads according to the invention without CPP. It is observed, on FIG. 4, that the sandwich breads according to the invention without CPP, whether or not they were contaminated, go moldy less rapidly than the control sandwich breads containing CPP.

Figure 5:
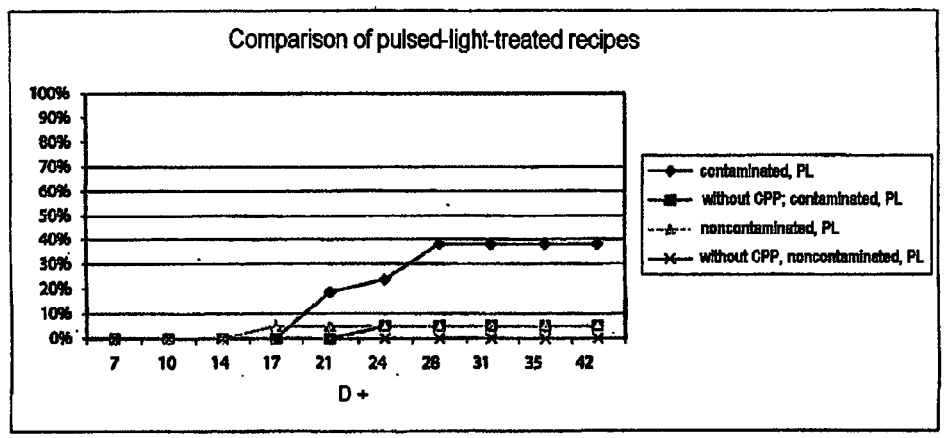
FIG. 5 gives the curve of the percentage of pulsed-light-treated sandwich breads having gone moldy over time.

FIG. 5 gives the curve of the percentage of pulsed-light (PL) treated sandwich breads having gone moldy over time, with comparison of control sandwich breads with CPP and of sandwich breads according to the invention without CPP. It is observed, on FIG. 5, that the contaminated and pulsed-light-treated control sandwich breads containing CPP are 40% moldy after 28 days. The contaminated sandwich breads according to the invention without CPP which have been treated exhibit a degree of mold of less than 5%. For noncontaminated products, the control sandwich breads containing CPP go moldy to a degree of 5%, while the sandwich breads according to the invention without CPP do not go moldy.

Conclusion:

According to the results above, it can be concluded that the sandwich breads according to the invention which do not contain added chemical preservative of the E200 range, for example CPP, go less moldy than the control sandwich breads containing said CPP, whether they are contaminated or noncontaminated. In addition, the pulsed-light treatment is more effective on the sandwich breads according to the invention than on control sandwich breads with CPP.

The method according to the invention is simple and economical to carry out in an industrial environment and makes it possible to obtain bakery products, in particular sandwich breads or the like, which have been baked and decontaminated such that their BBD is very significantly increased, preferably without using added chemical preservative of the E200 range, and while at the same time having an attractive appearance and organoleptic qualities comparable to conventional bakery products.

The invention claimed is:

1. An industrial method for producing decontaminated bakery products, wherein said method comprises the following:
   (1) preparing a dough by mixing the following ingredients in the absence of a chemical preservative of the E200 range:
      A. flour;
      B. water;
      C. optionally, added fat(s);
      D. at least one fermentation agent;
      E. NaCl;
      F. optionally, sugar(s);
      G. at least one filler selected from the group consisting of hydrogenated monosaccharides, hydrogenated oligosaccharides, hydrogenated isomaltulose, lactitol, maltitol, erythritol, xylitol, mannitol, sorbitol, and mixtures thereof;
      H. at least one breadmaking improver comprising glucono-delta-lactone (GDL) in combination with either an acid or acid salt;
      I. optionally, at least one low-sodium mixture of minerals,; and,
      J. optionally, one or more additives other than a chemical preservative of the E200 range;
   (2) shaping said dough;
   (3) fermenting said dough thus prepared;
   (4) at least partially baking said dough thus shaped;
   (5) optionally cooling the bread;

(6) decontaminating the bread by pulsed-light treatment;
(7) optionally slicing the bread;
(8) packaging said bread,
such that said bread exhibits a longer shelf life, defined by its Best Before Date, than a bread whose dough contains a chemical preservative of the E200 range and which is prepared according to steps (1) to (8) above.

2. The method of claim 1, wherein, during step 1, at least one of the following quantitative characteristics is used, the % data being baker's %: % by weight relative to the weight of flour A:
 i. $0 < C \leq 30$;
 ii. $0.1 \leq G \leq 10$;
 iii. $0.05 \leq H \leq 5$;
 iv. $0.05 \leq I \leq 5$.

3. The method of claim 1, wherein the added fat(s) C is (are) selected from the group consisting of rapeseed oil, soya oil, shortening, palm oil, butter, margarine and mixtures thereof.

4. The method of claim 1, wherein the acid or acid salt of the breadmaking improver H is selected from the group consisting of:
 acid preferments,
 food acids,
 and mixtures thereof.

5. The method of claim 1, wherein the additive(s) J is (are) selected from the group consisting of additives for improving the softness, stabilizers; technological additives, microbiological preservation additives from the group comprising: ascorbic acid, L-cysteine or deactivated yeast, and mixtures thereof.

6. The method of claim 1, wherein at step (3), the fermentation is activated by exposure of the dough to a source of microwaves with an emission power such that the increase in temperature induced at the heart of the dough is less than or equal to the yeast inactivation temperature.

7. The method of claim 1, comprising the step (5) for cooling the bread, via which the temperature of the bread is brought to at most 40° C.

8. The method of claim 1, wherein, in step (6) of decontaminating the bread by pulsed-light treatment, each bread is subjected to at least one flash, produced by one or more lamps, such that the level of energy received by the bread is greater than or equal to 0.5 J/cm$^2$.

9. The method of claim 8, wherein the bread lies on a support which is transparent to the light of the flash(es), when it is subjected to said flash(es), and in that all or part of the lamps envisioned are placed less than 10 cm from the bread.

10. The method of claim 8, wherein the breads treated in step (6) circulate on conveying means and wherein the process is carried out in such a way that at least one of the following arrangements is implemented for step (6):
 the space between two successive breads is sufficient to enable the lamps, after the production of one or more flashes for a given bread, to be once again operational for the production of one or more flashes for the following bread,
 the breads are all positioned in substantially the same way relative to the lamps when they are subjected to the flash(es).

11. The method of claim 1, wherein steps 1-8 are performed consecutively.

12. The method of claim 1, wherein said shaping of dough is performed using a mold.

13. The method of claim 1, wherein the bread is packaged into bags.

14. The method of claim 2, wherein, during step 1, at least one of the following quantitative characteristics is used, the % data being baker's %: % by weight relative to the weight of flour A:
 i. $0 \leq C \leq 25$;
 ii. $0.1 \leq G \leq 5$;
 iii. $0.05 \leq H \leq 4$;
 iv. $0.05 \leq I \leq 4$.

15. The method of claim 14, wherein, during step 1, at least one of the following quantitative characteristics is used, the % data being baker's %: % by weight relative to the weight of flour A:
 i. $0 \leq C \leq 20$;
 ii. $0.1 \leq G \leq 4$;
 iii. $0.05 \leq H \leq 4$;
 iv. $0.05 \leq I \leq 3$.

16. The method of claim 4, wherein said acid preferments are selected from the group consisting of dry leavens, pasty leavens, liquid leavens and mixtures thereof.

17. The method of claim 4, wherein food acids are selected from the group consisting of lactic acid, lactic acid salts, acetic acid, acetic acid salts, propionic acid, propionic acid salts, benzoic acid, benzoic acid salts, sorbic acid and sorbic acid food salts, malic acid, malic acid salts, citric acid, citric acid salts, ascorbic acid, ascorbic acid salts, alginic acid, alginic acid salts and mixtures thereof.

18. The method of claim 5, wherein the additive for improving the softness is selected from the group consisting of emulsifiers, thickeners and hydrocolloids.

19. The method of claim 5, wherein the stabilizer is selected from the group consisting of oxidants, enzymes, cereal flours and reducing agents.

20. The method of claim 5, wherein additive J is the alpha-amylase enzyme.

21. The method of claim 6, wherein the temperature induced at the heart of the dough for this microwave activation is between 30° C. and 50° C., the humidity being such that it is between 60% and 99% ERH (equilibrium relative humidity).

22. The method of claim 21, wherein the temperature induced at the heart of the dough for this microwave activation is between 36° C. and 42° C., the humidity being such that it is between 70% and 95% ERH (equilibrium relative humidity).

23. The method of claim 9, wherein all or part of the lamps are placed less than 5 cm from the bread.

* * * * *